US006926023B2

(12) United States Patent
Cabral et al.

(10) Patent No.: US 6,926,023 B2
(45) Date of Patent: Aug. 9, 2005

(54) AUTOMATIC AIR RELEASE SYSTEM WITH SHUTOFF VALVE

(75) Inventors: Michael F. Cabral, Wildwood, MO (US); Michael D. Kirn, Chesterfield, MO (US)

(73) Assignee: Potter Electric Signal Company, St. Louis, MO (US)

( * ) Notice: Subject to any disclaimer, the term of this patent is extended or adjusted under 35 U.S.C. 154(b) by 21 days.

(21) Appl. No.: 10/768,551

(22) Filed: Jan. 30, 2004

(65) Prior Publication Data

US 2005/0005967 A1 Jan. 13, 2005

Related U.S. Application Data

(60) Provisional application No. 60/443,796, filed on Jan. 30, 2003.

(51) Int. Cl.[7] ........................................... F16K 24/04

(52) U.S. Cl. ........................... 137/2; 137/199; 137/202

(58) Field of Search ............................ 137/2, 199, 202

(56) References Cited

U.S. PATENT DOCUMENTS 4,104,004 A 8/1978 Graef
4,708,157 A 11/1987 Sabatino
6,024,116 A 2/2000 Almberg et al.

*Primary Examiner*—Gerald A. Michalsky
(74) *Attorney, Agent, or Firm*—Lewis, Rice & Fingersh, L.C.

(57) ABSTRACT

Systems and methods are provided that allow for the continued operation of a fire sprinkler or standpipe system after the failure of an air release valve, wherein connected to the air release valve is a system that collects and contains fire extinguishing liquid leaked from an air release valve, as well as being able to detect and stop such leaks that could not be contained by the system.

17 Claims, 5 Drawing Sheets

AUTOMATIC AIR RELEASE SYSTEM WITH SHUTOFF VALVE

CROSS-REFERENCE TO RELATED APPLICATIONS

This application claims the benefit of U.S. Provisional Application No. 60/443,796, filed Jan. 30, 2003.

BACKGROUND OF THE INVENTION

1. Field of Invention

This apparatus relates to the automatic removal of air from sprinkler and standpipe systems without having to hard pipe discharge liquid to a drain.

2. Description of Related Art

To fight fires in modern office buildings, firefighters use a wide variety of tools but are also regularly aided by systems (fire sprinkler and standpipe systems) within the building itself. Modern buildings almost universally include fire sprinkler systems to contain or extinguish fires in the building without human intervention. Modern buildings that have large foot prints or are three stories or more in height are also provided with standpipe systems for manual intervention by either occupants or firefighters.

Fire sprinkler systems generally follow a fairly standardized principle. A liquid firefighting material (including a true liquid, a colloid, a gel, a foam, and any fluid for fighting fires) is maintained in a series of pipes, generally under pressure, which are generally arranged throughout all areas of the building. Attached to these pipes are various fire sprinklers which, when activated, will spray the liquid in a predetermined pattern into a predetermined area. When a fire situation occurs, various sprinklers near the location of the fire will activate by a heat sensitive element included with each individual sprinkler. When a particular fire sprinkler is activated, the liquid in the pipe is dispensed by the fire sprinkler in a predetermined manner. This action dispenses the liquid on the fire and serves to control or extinguish the fire.

Standpipe systems also follow a fairly standardized principle. A liquid fire fighting material (including a true liquid, a colloid, a gel, a foam, and any fluid for fighting fires) is maintained in a series of pipes, generally under pressure, which are generally located in fire resistive enclosures such as stairs and corridors so as to reach all areas of the building. Standpipe systems have three classifications as defined by the National Fire Protection Association Design Standard 14, Standpipe Systems. Attached to these pipes are various valves and sometimes hoses for manual use by building occupants or fire fighters. When a fire occurs a fire hose valve is manually opened allowing liquid to flow through a hose and nozzle manually delivering liquid to the fire, and thereby controlling or extinguishing the fire.

Maintenance must be performed on these fire sprinkler or standpipe systems on a regular basis, sometimes entailing removal and replacement of sections of pipe or other appliances that are part of the system. Almost necessarily during such maintenance, a portion of the fire sprinkler or standpipe system, or the whole system, must be relieved of pressure, drained, and refilled. The process of draining and refilling allows air to enter the system. When the system is refilled air becomes trapped in the system. Such trapped air is a problem in nearly all such fire sprinkler and standpipe systems. Trapped air may cause inefficient operation of the system due to incomplete filling of the system, less effective pressurization and liquid delivery, and other operating problems. Also, trapped air is certainly a cause of corrosion within the system. Not only is the corrosion a problem in itself, because of the possibility of pieces of the corroded system detaching and traveling internally to clog various portions of the system or appliances thereon, but also the corrosion is a cause for the maintenance procedures that lead to potentially more corrosion through the introduction of more air via the draining and refilling process.

Existing valves for the removal of air from other types of contained-liquid systems generally operate in accord with the following principles. As the liquid flows into a pipe or appliance of such a contained-liquid system, the air in the system is displaced upward and into the air release valve which is attached by a connector to the pipe or other appliance, the connector thereby providing an aperture through which air or liquid can flow from the pipe and into the valve. The valve responds differently to air than to liquid, thus allowing air to be released, but not liquid. Where the valve is a float valve, air flows into a chamber and pushes a float or ball upwards within the chamber. The displaced float then allows the air to push around the float and escape out a hole in the top of the chamber. The float is constrained within the chamber by the connector and hole, as the float is generally too large to pass through either.

As the liquid level rises, liquid eventually flows through the connector and into the chamber. This action then pushes the float upward as the liquid level continues to rise. Eventually, the float is pushed up against the top hole by the underlying liquid which plugs the hole and prevents any further liquid (or air) from traveling through the hole. Generally when the hole is so plugged, most of the air has been removed from the pipe or appliance and the pipe or appliance is in its preferred operational state. The pipe or appliance is now preferably generally sealed to the outside world. Inherently, however, some liquid is discharged as the air is vented through such a air release valve, thus rendering the device unuseable in or over finished spaces. Two air valve systems which operate according to, his principle are shown in U.S. Pat. Nos. 4,708,157, and 4,104,004, the entire disclosures of which are herein incorporated by reference.

Problems with traditional air release valve designs arise from the discharge of some liquid during normal operation, and the possibility of large discharges upon eventual failure. Over the course of time, contained-liquid systems, of which such air release valves are a part, will be drained and refilled with liquid many times. During each of these drain and refill events, the air release valve will unseal, allow air and some liquid to escape, and then reseal. After a sufficient number of such drain and refill events the seal will wear to the point that it no longer completely seals the hole, and will then allow a constant flow of liquid to escape.

SUMMARY OF THE INVENTION

In order to manage corrosion in fire sprinkler and standpipe systems, and to allow for more effective operation of such systems, it is desirable that air be removed from the system at the time that the liquid firefighting material is introduced into the system as could generally be accomplished by either a manual or automatic air release valve. Generally, such a valve, whether manual or automatic, is not being utilized for either fire sprinkler or standpipe systems. The limited use of air release valves in fire sprinkler and standpipe systems has been primarily within fire pump housings where the removal of trapped air is critical to prevent cavitation of the pump impeller.

There are problems associated with the use of either manual or automatic air release valves generally throughout a fire sprinkler or standpipe system to remove air therefrom. One problem with the use of manual valves in such a fire sprinkler or standpipe system is that their use would require additional labor during the filling process, and would require retained knowledge of the system so persons could be directed to each and every such manual air release valve.

A problem with the use of automatic air release valves in fire sprinkler and standpipe systems is that, because no person would be present tending the air release, any inherent liquid release during normal operation of the valve would be discharged to the interior of the building in the area of the valve. Such a discharge can damage or destroy parts of the building (such as drywall or ceiling tiles), infrastructure in the building (such as power or computer cabling), or can damage objects within the building (such as merchandise, computers, fixtures, furniture, etc.). The problem of property damage is particularly weighty when considering the possibility of eventual failure of the valve, which would allow discharge of greater amounts of liquid. In order to prevent such damage would require the automatic air release valve to be hard-piped to a drain, which because of the requirements for the location of these valves becomes cost prohibitive, impractical, or virtually impossible to hard pipe these devices to a drain.

It is therefore desirable in the art not only to have air release valves within fire sprinkler and standpipe systems, but to have an apparatus or system that prevents uncontained liquid discharge from an air release valve, both during normal operation and in the event of failed valves. It is also desirable that such an air release valve on a fire sprinkler or standpipe system be able to indicate to a repair person that the valve has failed so that the valve can be replaced or repaired.

An embodiment of the invention is an air release valve included within a fluid-filled plumbing system. Another embodiment of the invention is an apparatus for preventing leaks from an air release valve on a fluid-filled plumbing system. Such an apparatus includes an air release valve coupled to a fluid-filled plumbing system, a liquid sensitive valve coupled to the air release valve, a liquid sensitive switch coupled to the liquid sensitive valve, a container for collecting fluid flow that passes from the air release valve, and a constrained path coupled to said air release valve. The constrained path allows fluid to flow from the air release valve through the constrained path and into the container in which it may be collected. The constrained path also includes the liquid sensitive valve. The liquid sensitive valve is designed to remain open until closed due to action of a liquid sensitive switch. In a preferred embodiment of the invention the fluid-filled plumbing system is a fire sprinkler or standpipe system in a building. Other preferred embodiments include an embodiment in which the liquid sensitive valve is a WAGS valve (as described in U.S. Pat. No. 6,024,116), and an embodiment in which the liquid sensitive valve is coupled to said air release valve via a generally U-shaped pipe.

Embodiments of the invention include the use of an apparatus as described above in a method for preventing fluid leakage from a failed air release valve on a fluid-filled plumbing system. Upon the failure of the air release valve an amount of fluid from the plumbing system will escape past the air release valve. In an embodiment, when such an apparatus as is described above is coupled to a fluid-filled plumbing system at such a failed air release valve, if the rate of leaking fluid is sufficiently high, the fluid will accumulate in the container triggering the liquid sensitive switch, which switch action leads to the closing of the liquid sensitive valve. Because the liquid sensitive valve is a component of the constrained path, when the liquid sensitive valve closes fluid flow through said constrained path is stopped. Thus, in an embodiment the apparatus effects the prevention of fluid leakage from an air release valve after some amount of fluid has passed through the failed air release valve.

In an embodiment of the invention that may be used to prevent leakage from a failed air release valve, the liquid sensitive switch is triggered after the leakage of a predetermined amount of fluid from the air release valve during a predetermined amount of time. The predetermined amount of fluid and time may be any appropriate amount. The predetermined amount of fluid may be an amount within a range, and such amount may be measured by any reasonable characteristic of the fluid, such as volume or weight. It may be the predetermined amount of fluid is a volume that passes a specified point in the constrained path, or it may be an amount that collects in the container. The predetermined time may also be an amount within a range, and measured by any method, such as an external clock or by the time required for a chemical reaction to occur. For instance, a sufficient volume to fill half the volume of the container and the time may be instantaneous, such that as soon as the container becomes half full the switch is triggered.

Another embodiment of the invention provides for a method for signaling the failure of an air release valve on a fluid-filled plumbing system. Such signaling may also enable the prevention of leakage from the failed air release valve such as where the signal induces rapid maintenance on the fluid-filled plumbing system. In such an embodiment an apparatus may be used that includes an air release valve coupled to a fluid-filled plumbing system, a constrained path coupled to said air release valve through which fluid may flow from the air release valve into a container, a container coupled to said fluid-filled plumbing system for containing fluid flow that passes from said air release valve through said constrained path, and a liquid sensitive switch within said container. As described above, when the air release valve fails fluid may accumulate in the container triggering the liquid sensitive switch. The triggering of the liquid sensitive switch may lead to a signal, which is an indication of the failure of the air release valve. Such a signal may use any method of signaling such as a visual signal, electrical signal, or an auditory signal.

Because of a recognized potential for a leak from a fluid-filled plumbing system to cause damage to objects and persons in the vicinity of the leak, an embodiment of the invention provides a method for preventing damage resulting from a failed air release valve on a fluid-filled plumbing system. Quite simply, damage from a leaking air release valve can be prevented by accumulating the leaking fluid in a container. A further method of preventing damage is to provide a liquid sensitive valve connected to the air release valve via a constrained path, which liquid sensitive valve is closed upon leakage from the air release valve.

DETAILED DESCRIPTION OF PREFERRED EMBODIMENTS

FIGS. 1 through 5 provide for an embodiment of a system (100) to prevent a failed air release valve (101) from leaking until it can be replaced. Such a system (100) can notify a manufacturer, building supervisor, or other party that the air release valve (101) has failed and needs to be replaced.

Figure 1:
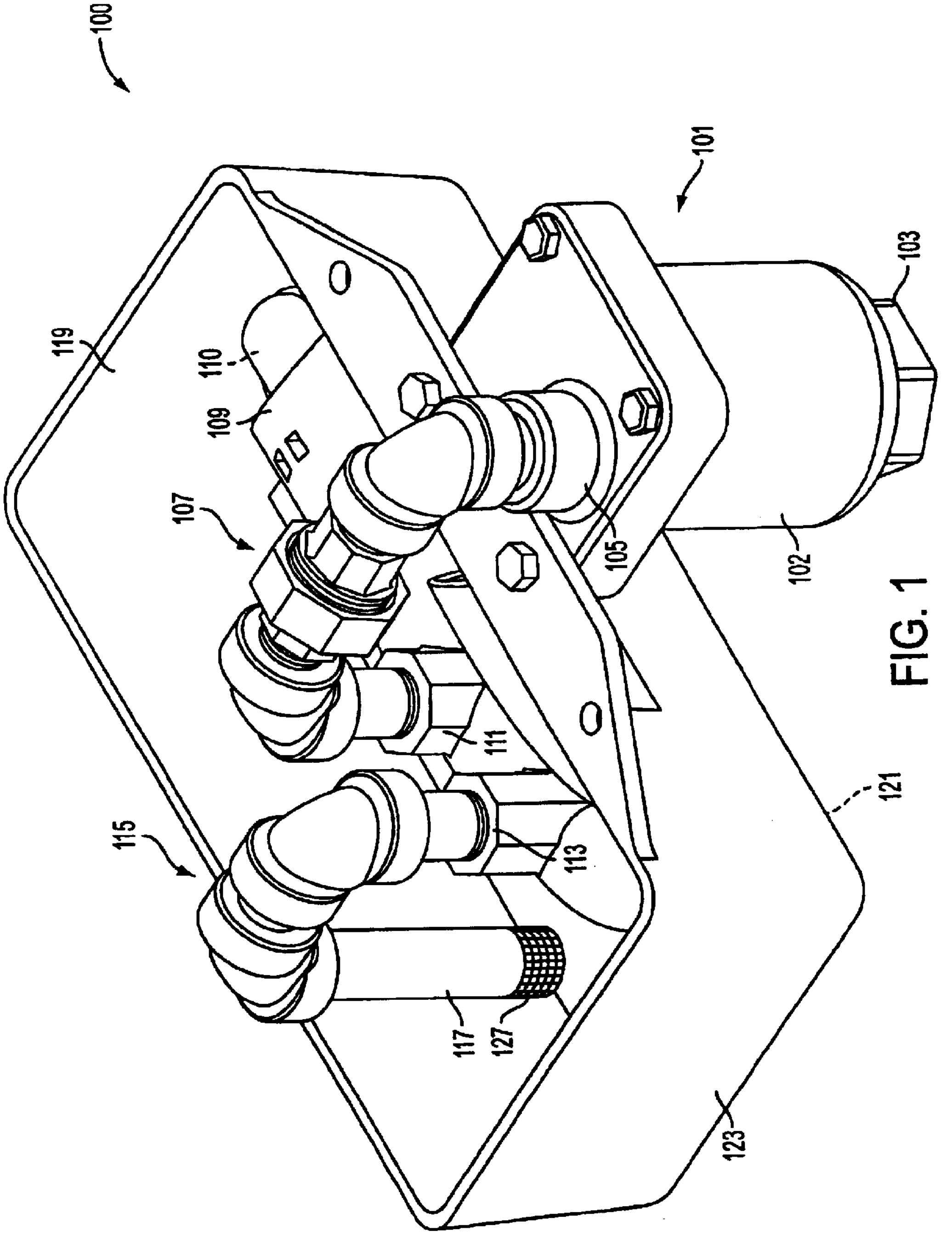
FIG. 1 shows a perspective view of an embodiment of an air release system of the present invention.
Figure 2:
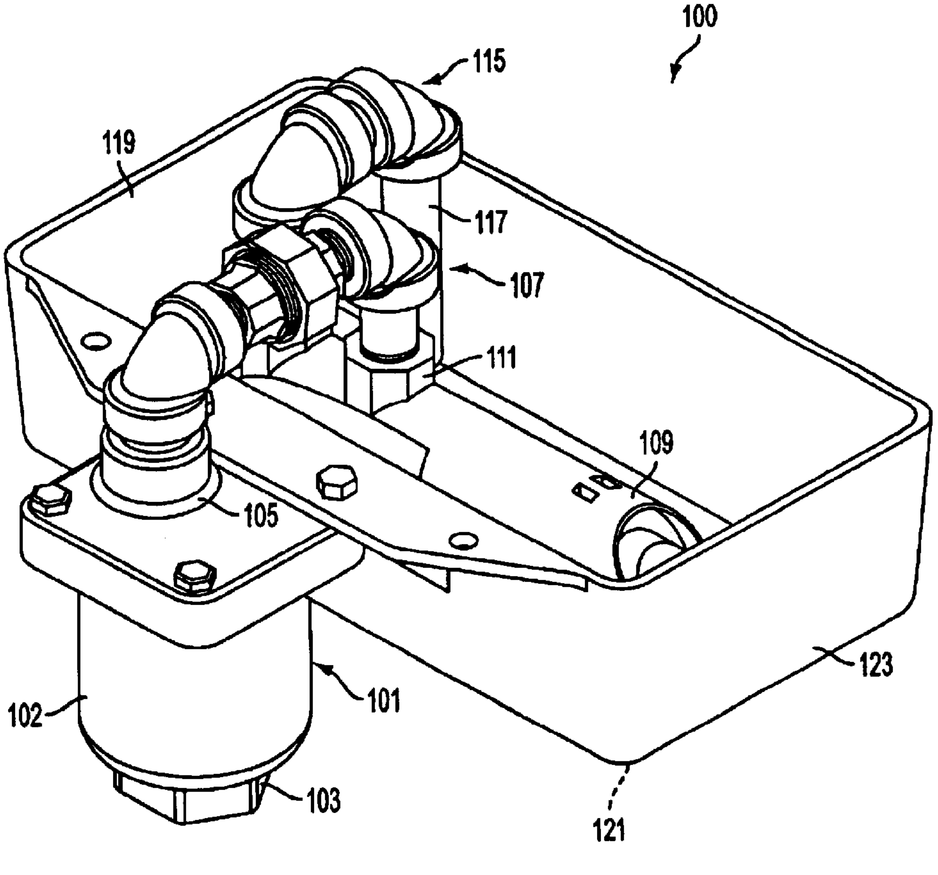
FIG. 2 shows a reverse angle view of the embodiment of FIG. 1.
Figure 3:
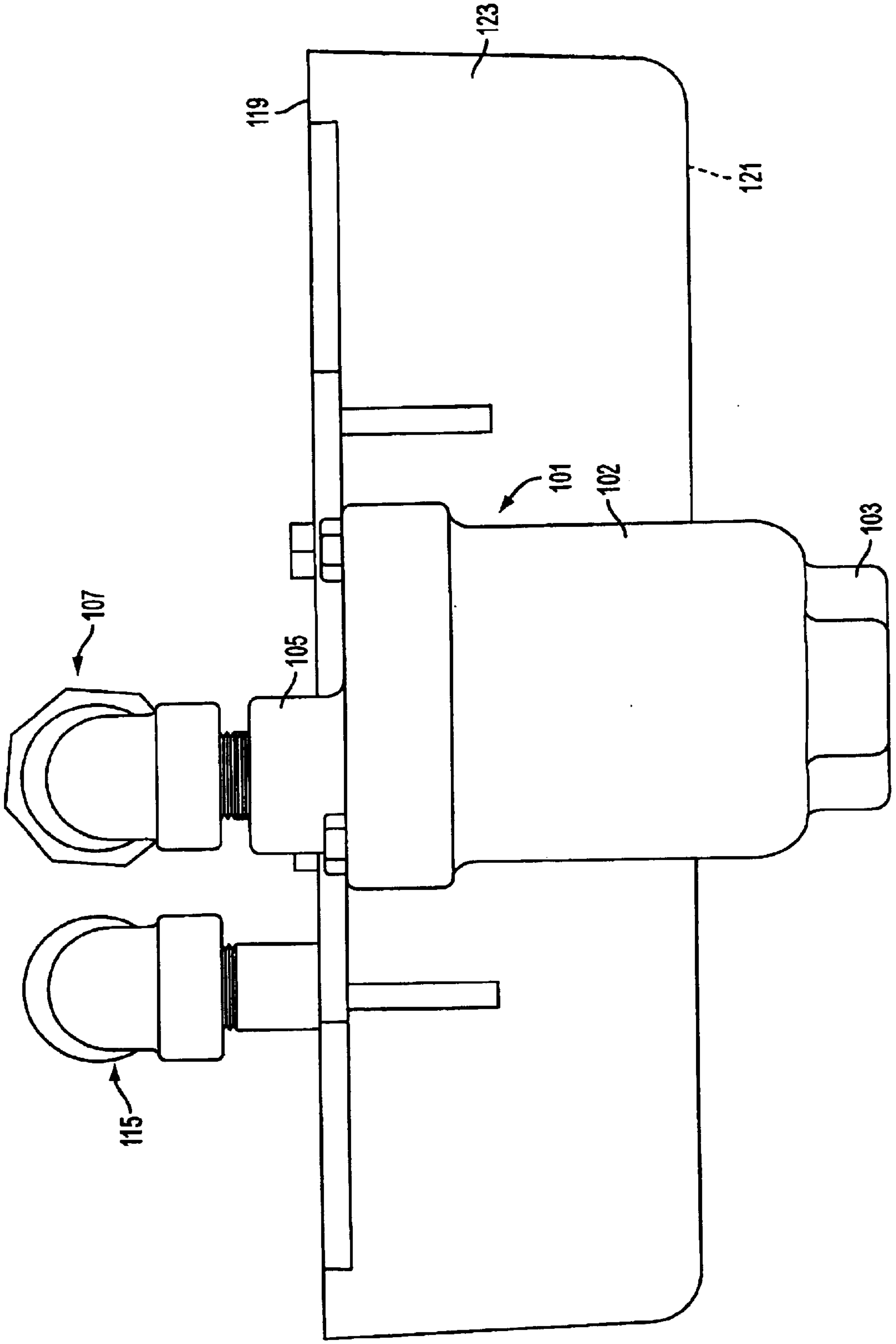
FIG. 3 shows a front view of the embodiment of FIG. 1.
Figure 4:
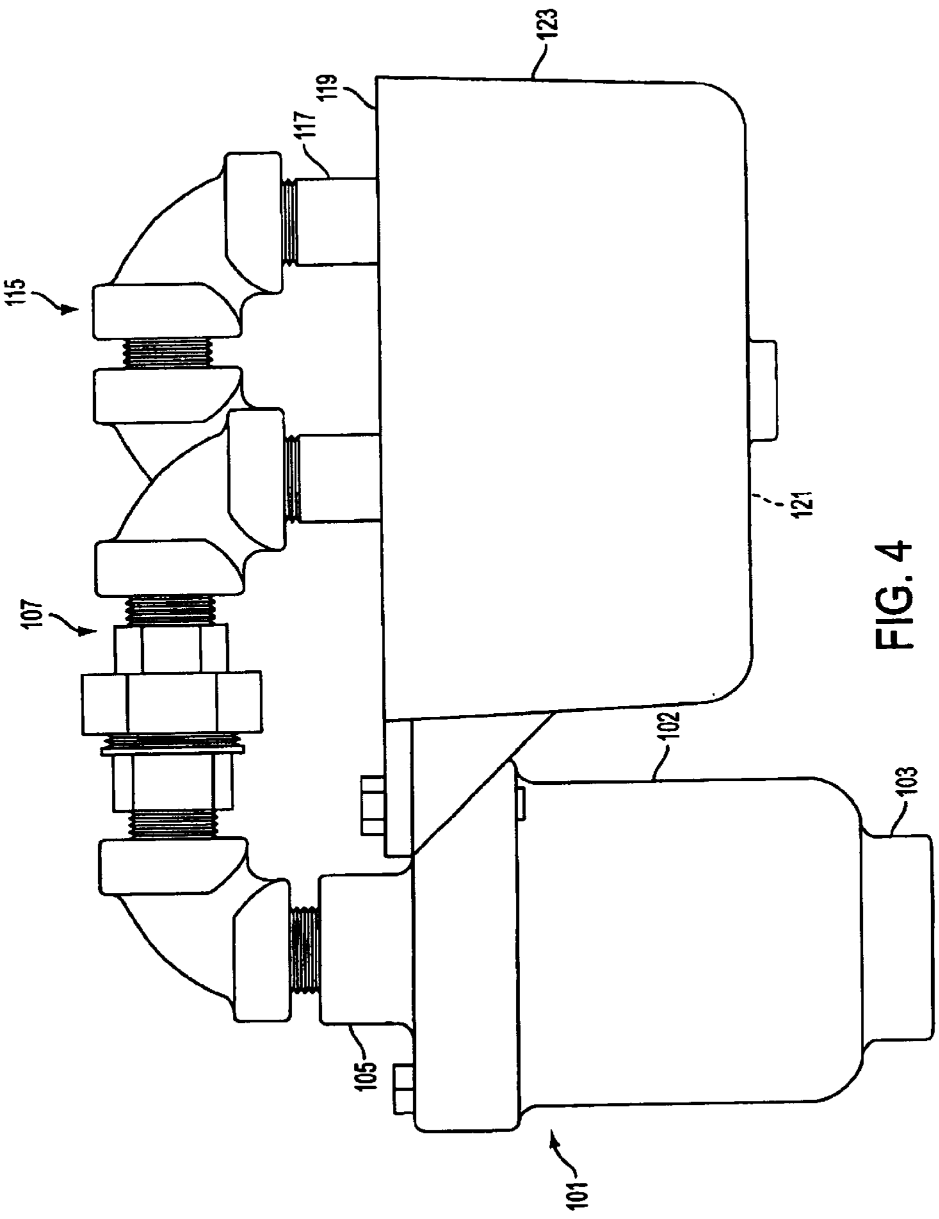
FIG. 4 shows a side view of the embodiment of FIG. 1
Figure 5:
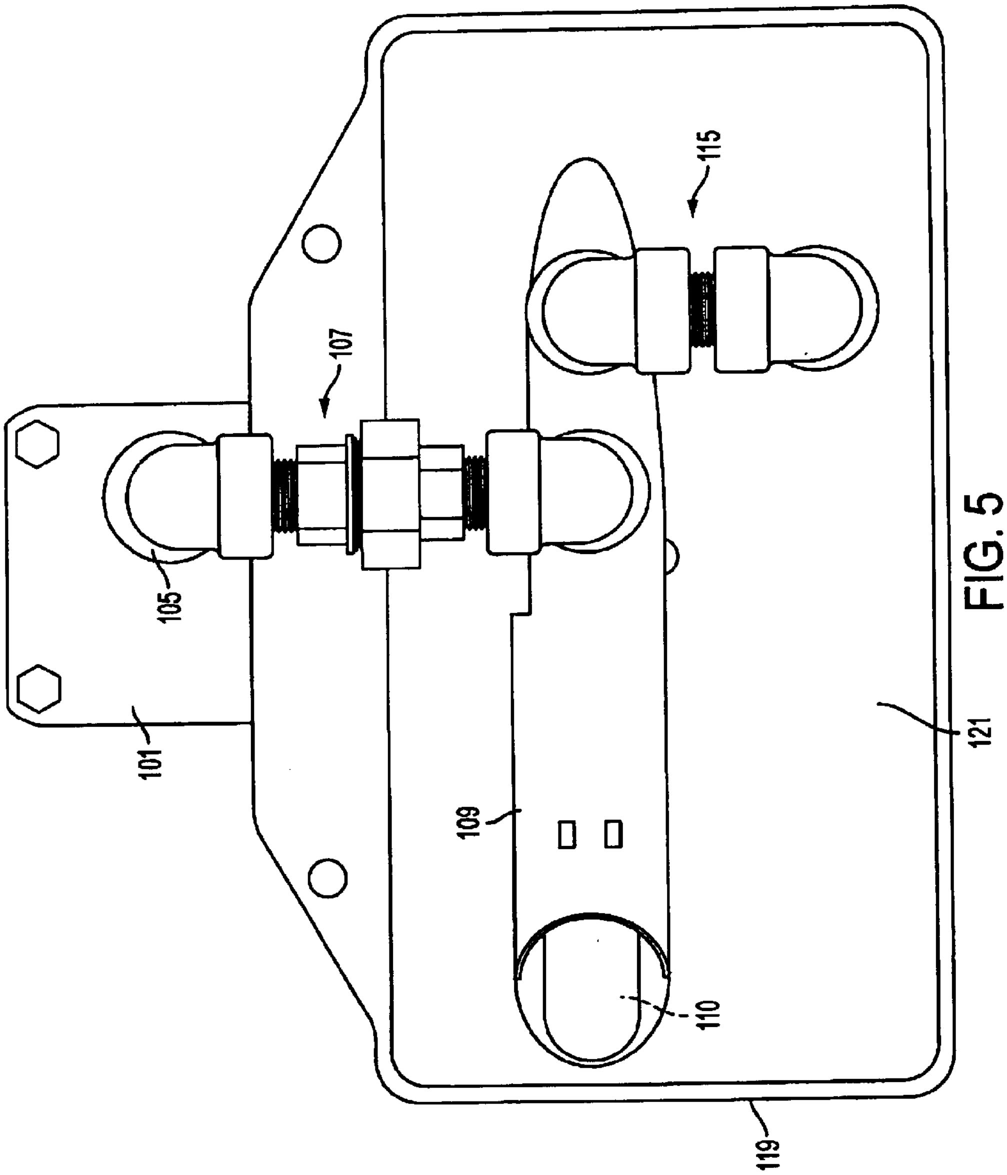
FIG. 5 shows a top view of the embodiment of FIG. 1.

As seen in FIG. 1, the system (100) includes an air release valve (101), which may be any type of air release valve regardless of mechanism but will generally be a float-and-chamber based release valve such as those discussed above. The air release valve (101) is attached via a coupler (103) to a pipe (not shown) which is part of a plumbing system (not shown), such as a fire sprinkler or standpipe system. While discussed mainly in relation to a fire sprinkler or standpipe system, embodiments of the invention may be useful on any fluid-filled plumbing system that comprises an air release valve (such as air release valve (101)), including a hot water, radiating heat system, or other fluid-filled plumbing systems.

The coupler (103) allows air and liquid to move from the pipe (not shown) through the coupler (103) and into the chamber (102) of the air release valve (101). On the top side of the air release valve (101) there is a second coupler (105) which couples the air release valve (101) to a first U-pipe (107). The first U-pipe (107) may be constructed of a singular piece or of many pipe components as shown in the figures. The first U-pipe (107) is in turn coupled via a connector (111) to a first input of a liquid sensitive valve (109). In another embodiment, the first U-pipe (107) may be a pipe of any shape; the U-shape is generally preferred, however.

In the depicted embodiment, the liquid sensitive valve (109) may be, but is not limited to, a so-called WAGS valve. As know to one of ordinary skill in the art, a WAGS valve may refer generally to a valve that works to shut off flow of various liquids and gases, or may refer specifically to the trademark on a valve that shuts off both water and gas supply to a water heater, such as is described in U.S. Pat. No. 6,024,116, the entire disclosure of which is herein incorporated by reference. The liquid sensitive valve (109) comprises two connectors (111) and (113). In the depicted embodiment, the first U-pipe (107) is attached to the first connector (111) and a second U-pipe (115) is attached to the second connector (113). Like the first U-pipe (107), the U-shape of the second U-pipe (115) is by no means required and the second U-pipe (115) may have any shape. However, the U-shape is generally preferred for both U-pipes (107 and 115). Fluid (whether air or liquid) is generally allowed to pass from connector (111) to connector (113) when the liquid sensitive valve (109) is open, whereas transmission between the two connectors (111) and (113) is generally prevented when liquid sensitive valve (109) is closed.

The second U-pipe (115) may have similar construction to the first U-pipe (107), or may be of an entirely different design. Attached at the opposite end of the second U-pipe (115) from the connector (113) is a downspout (117). Downspout (117) is generally just a piece of pipe that allows fluid to flow freely from the second U-pipe (115), except that downspout (117) may have a mesh screen (127) attached, a function of which is to prevent small objects such as debris and bugs from entering the system (100). In the depicted embodiment, the fluid will flow from the downspout (117) into the container (119), which is preferably an open topped container having a bottom surface (121).

The system (100) comprises a constrained path through which fluid may flow from the air release valve (101) into the container (119). In the depicted embodiment the constrained path comprises the generally U-shaped pipes (107 and 115), the liquid sensitive valve (109), and the downspout (117), as well as all of the connectors therebetween.

The container (119) of the figures is shown as having a generally parallelepipedic shape with an open top. This design is by no means required. It is generally preferred that the container be shaped so as to enable the containment of the volume of liquid leaked from the air release valve (101) during the time which liquid is leaking. It is also generally preferred that fluid in the container be exposed to the ambient environment as opposed to being enclosed within the system (100). It is more preferred that the container generally have a bottom surface (121) that, regardless of shape, has a fairly large surface area compared to the area of the opening of the downspout (117).

The system (100) generally operates as follows. If air release valve (101) is functioning as intended, only very small amounts of liquid in the fire sprinkler or standpipe system are generally allowed to leak out through the air release valve (101) when the fire sprinkler or standpipe system is filled with liquid. As the fire sprinkler or standpipe system is being filled with liquid, air in the fire sprinkler or standpipe system will move through the air release valve (101), will be pushed through the first U-Pipe (107), through the liquid sensitive valve (109) (which will be held in the open position), through the second U-pipe (115), and out the downspout (117) where it will escape from the constrained path of the system (100) and be released into the ambient environment.

If a small amount of liquid is able to escape through the air release valve (101), as may occur before the air release valve (101) seals or as may result from deterioration of the float, this liquid will generally be trapped inside one of the two U-Pipes (107 and 115) or in the liquid sensitive valve (109). This trapped liquid, therefore, cannot damage objects outside the fire sprinkler or standpipe system. Such trapped liquid will generally slowly evaporate and leave the system via downspout (117) in the form of a gas.

If enough liquid is released past air release valve (101), or the liquid is released under sufficient pressure, the liquid will spill from downspout (117) and will enter container (119) in liquid form and will spread out over the bottom surface (121) of the container (119). If the released amount is a single, isolated spurt (such as might occur while filling the fire sprinkler or standpipe system) or is released with a sufficiently slow flow rate, the liquid will generally be contained in container (119) and will evaporate before any significant amount of liquid can accumulate in container (119).

If the liquid released is of a significant quantity, or is of a sufficiently heavy flow rate, the liquid will still be captured in the container (119); however, in this situation, the liquid will accumulate at a rate faster than it is evaporating, and will, therefore, eventually spill from the container (119) if nothing else prevents continued accumulation. As the liquid level rises in container (119), eventually the liquid will reach a predetermined level. This may be a fixed level, may be a time-averaged level, or may be a level measured by other methods. The circumstance in which the liquid level in the container (119) reaches the predetermined level is a triggering event. The predetermined level is set at a value that is intended to indicate that too much liquid is escaping from the system for the container (119) to retain without spillage. Upon the occurrence of the triggering event, a liquid sensitive switch (110) is activated.

The liquid sensitive switch (110) may be any kind of switch appropriate for this circumstance. The switch may be triggered, for instance, by the presence of the liquid alone or by the presence of the liquid for a particular period of time, and may be triggered directly by the liquid or indirectly via a further consequence of the presence of the liquid. For instance, in an embodiment, the liquid sensitive switch may be a float switch similar to those used in toilets so that if the float rises to a particular height the switch is triggered. In another embodiment, the liquid sensitive switch may be a chemical switch which detects the presence of the particular liquid (or which detects the presence of a particular molecule in the particular liquid) used in the fire sprinkler or standpipe system. In a still further embodiment, the liquid sensitive switch (110) may be a soluble switch, in which a gasket or similar device that maintains the valve in an open position, reacts (chemically or physically, such as by dissolving) to exposure to the liquid in a manner that results in the closing of the valve. Such"switches" as may be useful herein have been used for a variety of applications such as, but not limited to, the WAGS device and self-inflating life preservers and life rafts, and are known to one of ordinary skill in the art. Therefore, the liquid sensitive switch (110) may be anything which detects or reacts to the presence of a predetermined level of liquid in the container (119), possibly only detecting or reacting after the presence of the liquid for a certain period of time. The liquid sensitive switch (110) may detect or react to the liquid itself or a component thereof, such as a material dissolved or suspended therein.

Regardless of how the liquid sensitive switch is triggered, the triggering of the switch activates the closure of the liquid sensitive valve (109). When the liquid sensitive valve (109) is closed, fluid is prevented from traveling from the connector (111) to the connector (113). In this way the liquid flow through the constrained path, flow which resulted in the triggering of the liquid sensitive switch, is stopped. It should be noted that this situation also prevents air from escaping from air release valve (101) since all flow from the air release valve (101) is stopped. Generally, the triggering of liquid sensitive switch (110) indicates that the air release valve (101) has failed. Through the closure of the liquid sensitive valve (109), the liquid sensitive valve (109) effectively acts as a failsafe to the air release valve (101) stopping all fluid flow through the constrained path in the event that the air release valve (101) fails.

It is preferable that the liquid sensitive valve (109) is automated for a single closing only. That is, if the liquid level recedes after the liquid sensitive valve (109) has been closed (perhaps because the liquid evaporates and there is no longer any fluid flowing from downspout (117)), the liquid sensitive valve (109) does not reopen to allow fluid passage between connectors (111) and (113). In this way the liquid which has collected in the container (119) can be allowed to slowly evaporate without concern that the liquid sensitive valve (109) will reopen, which would allow more liquid to escape. In an alternative embodiment, however, a liquid sensitive valve (109) may be used that does reopen.

The container (119) is preferably designed so that under most circumstances the liquid sensitive switch will be triggered prior to the container (119) being completely filled with liquid. Therefore, the liquid which does escape is collected within the container (119) and is allowed to slowly evaporate over time. In this way the liquid is contained after it has escaped from the fire sprinkler or standpipe system cannot damage any objects outside of the container (119). In an embodiment, it may be desirable that the container (119) be sealed to prevent the liquid from evaporating and escaping into the atmosphere. In this embodiment, the liquid sensitive switch may be constructed to detect an increase in total liquid collected, wherein a predetermined increase becomes a triggering event.

After it is triggered, the liquid sensitive valve (109) maybe reset by maintenance personnel or may require replacement. Preferably, the whole system (100) is replaced or repaired at once after the liquid sensitive valve (109) has closed. Generally, during the next regular draining of the fire sprinkler or standpipe system for routine maintenance, the entire system (100) may be safely removed and repaired or replaced with a new system (100) before the fire sprinkler and standpipe system is refilled with liquid. One advantage of using the system (100) is that it allows for a liquid leak to be stopped before it has the opportunity to cause significant damage. Further, when the liquid sensitive valve (109) closes, indicating that the air release valve (101) has failed, it is not necessary to specially drain the system to replace the air release valve (101) so as to prevent liquid escape. Instead, because the liquid sensitive valve (109) closes upon failure of the air release valve (101), the system (100) allows for the faulty air release valve (101) to be left in place until the next regular draining of the fire sprinkler or standpipe system without compromising the integrity of the fire sprinkler or standpipe system. Failed or faulty air release valves (101) can, therefore, be replaced during routine maintenance procedures rather than being cause for a special maintenance procedure.

In order to aid in a maintenance worker's (or other interested party's) determination that the air release valve (101) has failed, the liquid sensitive valve (109) may include or be attached to a signaling device or multiple signaling devices. Such a signaling device may indicate that the liquid sensitive valve (109) has closed (or that the liquid sensitive switch has triggered) and, therefore, the air release valve (101) needs to be replaced or repaired at the next opportunity. These signaling devices may comprise virtually any type of signaling mechanism. For instance, the liquid sensitive valve (109), or the liquid sensitive switch, or any other part of the system (100) could include or activate a visual indicator that indicates air release valve (101) failure by the display of a flag, a color, a light, or any other visual mechanism. Alternatively, the system (100) could include or activate an audio device that could chirp, beep, hiss, ring, buzz, or make other noises continuously or at various intervals. Signaling mechanisms or indicators other than visual or auditory indicators may also be used. And, various signaling mechanisms may be used simultaneously.

In still another embodiment of the invention, the system (100) could be connected to a remote indicator. For instance, instead of indications at the system (100), the indication may be sent to a remote location (such as through a data connection, phone line, or wireless link) which may be located anywhere in the building where the fire sprinkler or standpipe system is (such as a centralized maintenance location) or may be located at an entirely separate location (such as that of the fire sprinkler or standpipe system provider, building owner, or other monitoring entity).

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. An apparatus for preventing leaks from an air release valve on a fluid-filled plumbing system, comprising:

an air release valve coupled to a fluid-filled plumbing system;

a liquid sensitive valve coupled to said air release valve, said liquid sensitive valve being designed to remain open until said liquid sensitive valve is closed due to action of a liquid sensitive switch;

a liquid sensitive switch coupled to said liquid sensitive valve;

a container for collecting fluid flow that passes from said air release valve;

a constrained path coupled to said air release valve, said constrained path allowing fluid to flow from said air release valve through said constrained path and into said container; and wherein said constrained path comprises said liquid sensitive valve.

2. An apparatus of claim 1 wherein said fluid-filled plumbing system is a fire sprinkler or standpipe system.

3. An apparatus of claim 1 wherein said liquid sensitive valve is a WAGS valve.

4. An apparatus of claim 1 wherein said liquid sensitive valve is coupled to said air release valve via a generally U-shaped pipe.

5. An apparatus of claim 1 wherein said liquid sensitive switch is selected from the group including, a float switch, a chemical switch, and a soluble switch.

6. An apparatus of claim 1 wherein said liquid sensitive switch is triggered upon the leakage of a predetermined amount of fluid from said air release valve during a predetermined amount of time.

7. An apparatus of claim 1 wherein said liquid sensitive switch is triggered upon the collection in the container of a predetermined amount of collected fluid, wherein said predetermined amount of collected fluid remains in said container for a predetermined amount of time.

8. An apparatus of claim 1 wherein the triggering of said liquid sensitive switch causes said liquid sensitive valve to close.

9. An apparatus of claim 1 wherein the closure of said liquid sensitive valve prevents fluid from passing from said air release valve through said constrained path into said container.

10. An apparatus of claim 1 wherein said container has an open top.

11. A method for preventing damage resulting from a failed air release valve on a fluid-filled plumbing system, comprising:

providing an apparatus comprising:

an air release valve coupled to a fluid-filled plumbing system;

a constrained path coupled to said air release valve through which fluid may flow from said air release valve into a container; and a container coupled to said fluid-filled plumbing system for containing fluid flow that passes from said air release valve through said constrained path;

accumulating liquid in said container upon the failure of said air release valve; and preventing damage resulting from a failed air release valve through containment of the accumulated liquid.

12. A method for preventing damage of claim 11, further comprising:

providing an apparatus further comprising:

a liquid sensitive valve coupled to said air release valve, said liquid sensitive valve being designed to remain open until said liquid sensitive valve is closed due to action of a liquid sensitive switch;

a liquid sensitive switch coupled to said liquid sensitive valve; and wherein said constrained path comprises said liquid sensitive valve;

triggering said liquid sensitive switch due to the accumulation of liquid in said container;

closing said liquid sensitive valve as a result of the triggering of said liquid sensitive switch;

stopping fluid flow through said constrained path upon the closure of said liquid sensitive valve;

preventing leakage from said air release valve by stopping fluid flow through said constrained path; and preventing damage resulting from a failed air release valve through the prevention of leakage from said air release valve.

13. A method of claim 12 wherein said liquid sensitive valve is a WAGS valve.

14. A method for preventing damage of claim 11, further comprising:

providing an apparatus further comprising:

a liquid sensitive valve coupled to said air release valve, said liquid sensitive valve being designed to remain open until said liquid sensitive valve is closed due to action of a liquid sensitive switch;

a liquid sensitive switch coupled to said liquid sensitive valve; and wherein said constrained path comprises said liquid sensitive valve;

triggering said liquid sensitive switch due to leakage of a predetermined amount of fluid from said air release valve during a predetermined amount of time;

closing said liquid sensitive valve as a result of the triggering of said liquid sensitive switch;

stopping fluid flow through said constrained path upon the closure of said liquid sensitive valve;

preventing leakage from said air release valve by stopping fluid flow through said constrained path; and preventing damage resulting from a failed air release valve through the prevention of leakage from said air release valve.

15. A method of claim 14 wherein said liquid sensitive valve is a WAGS valve.

16. A method for signaling the failure of an air release valve on a fluid-filled plumbing system, comprising:

providing an apparatus comprising:

an air release valve coupled to a fluid-filled plumbing system;

a constrained path coupled to said air release valve through which fluid may flow from said air release valve into a container;

a container coupled to said fluid-filled plumbing system for containing fluid flow that passes from said air release valve through said constrained path; and a liquid sensitive switch within said container;

accumulating liquid in said container upon the failure of said air release valve;

triggering said liquid sensitive switch due to the accumulation of liquid in said container; and signaling the failure of the air release valve as a result of the triggering of said liquid sensitive switch.

17. A method of signaling of claim 16 wherein the step of signaling further comprises use of at least one of a visual signal, an electrical signal, and an auditory signal.

* * * * *